United States Patent
Kim

(10) Patent No.: US 11,943,672 B2
(45) Date of Patent: *Mar. 26, 2024

(54) METHOD AND APPARATUS FOR REDUCED CAPABILITY TERMINAL TO DETERMINE INTRA-FREQUENCY CELL RESELECTION PARAMETER IN MOBILE WIRELESS COMMUNICATION SYSTEM

(71) Applicant: BLACKPIN INC., Seoul (KR)

(72) Inventor: Soenghun Kim, Hanam (KR)

(73) Assignee: BLACKPIN INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/089,586

(22) Filed: Dec. 28, 2022

(65) Prior Publication Data

US 2023/0199583 A1    Jun. 22, 2023

Related U.S. Application Data

(63) Continuation of application No. 17/881,535, filed on Aug. 4, 2022, now Pat. No. 11,582,657.

(30) Foreign Application Priority Data

Sep. 7, 2021    (KR) .................... 10-2021-0119149

(51) Int. Cl.
*H04W 36/00*    (2009.01)
*H04W 36/08*    (2009.01)
*H04W 48/10*    (2009.01)
*H04W 4/70*    (2018.01)

(52) U.S. Cl.
CPC ... *H04W 36/0079* (2018.08); *H04W 36/0061* (2013.01); *H04W 36/08* (2013.01); *H04W 48/10* (2013.01); *H04W 4/70* (2018.02)

(58) Field of Classification Search
CPC .......... H04W 74/0833; H04W 72/042; H04W 72/04; H04W 74/006; H04W 48/10; H04W 48/02; H04W 36/08; H04W 4/70
See application file for complete search history.

(56) References Cited

FOREIGN PATENT DOCUMENTS

| KR | 10-1967573 B1 | 4/2019 |
|---|---|---|
| KR | 10-2020-0110327 A | 9/2020 |
| KR | 10-2021-0028707 A | 3/2021 |

OTHER PUBLICATIONS

Ericsson, R2-2108277, Running 38331 CR for RedCap, 3Gpp TSG RAN WG2 #115-E, Aug. 5, 2021.
Nokia et al., R1-2106648, UE Complexity Reduction Aspects Related to Reduced Maximum UE Bandwidth, 3GPP TSG RAN WG1 #106-E, Aug. 6, 2021.

*Primary Examiner* — Nam T Huynh
(74) *Attorney, Agent, or Firm* — Nicholas Park

(57) ABSTRACT

A method and apparatus for selecting a NR cell in a mobile communication system are provided. Method for selecting a NR cell includes selecting, by a terminal, a first cell, performing, by the terminal a first operation group if the terminal fails to acquire MIB in the first cell and performing, by the terminal a second operation group if the terminal succeeds to acquire MIB and SIB1 in the first cell and the MIB includes cellBarred set to barred and the SIB1 includes a intraFreqReselection set to NotAllowed.

3 Claims, 8 Drawing Sheets

User Plane Protocol Stack

Control Plane Protocol Stack

METHOD AND APPARATUS FOR REDUCED CAPABILITY TERMINAL TO DETERMINE INTRA-FREQUENCY CELL RESELECTION PARAMETER IN MOBILE WIRELESS COMMUNICATION SYSTEM

CROSS-REFERENCE TO RELATED APPLICATION

This patent application is a Continuation Application of U.S. patent application Ser. No. 17/881,535, filed on Aug. 4, 2022, pending at the time of filing of the present patent application, which claims the benefit of priority based on Korean Patent Application No. 10-2021-0119149, filed on Sep. 7, 2021, the disclosure of which is incorporated herein by reference in its entirety.

BACKGROUND

Technical Field

The present disclosure relates to a method and apparatus for a terminal with reduced capability in a wireless communication system to obtain system information and access a New Radio cell.

Related Art

To meet the increasing demand for wireless data traffic since the commercialization of 4th generation (4G) communication systems, the 5th generation (5G) system is being developed. For the sake of high, 5G system introduced millimeter wave (mmW) frequency bands (e. g. 60 GHz bands). In order to increase the propagation distance by mitigating propagation loss in the 5G communication system, various techniques are introduced such as beamforming, massive multiple-input multiple output (MIMO), full dimensional MIMO (FD-MIMO), array antenna, analog beamforming, and large-scale antenna. In addition, base station is divided into a central unit and plurality of distribute units for better scalability. To facilitate introduction of various services, 5G communication system targets supporting higher data rate and smaller latency.

Various attempts are being made to apply the 5G communication system to the IoT network. For example, 5G communication such as sensor network, machine to machine communication (M2M), and machine type communication (MTC) is being implemented by techniques such as beam forming, MIMO, and array antenna.

The terminal performing the MTC communication requires only limited performance compared to a general smart phone, and a terminal having only reduced capability for MTC communication is referred to as a RedCap UE. In order to efficiently support RedCap UE in a mobile communication system, there is a need to introduce a new technology to an existing mobile communication system.

SUMMARY

Aspects of the present disclosure are to address the various methods of implementing NR cell access in mobile communication system. Accordingly, an aspect of the present disclosure is to provide a method and an apparatus for selecting, by a terminal, a first cell, performing, by the terminal a first operation group if the terminal fails to acquire MIB in the first cell and performing, by the terminal a second operation group if the terminal succeeds to acquire MIB and SIB1 in the first cell and the MIB includes cellBarred set to barred and the SIB1 includes a intraFreqReselection set to NotAllowed.

DETAILED DESCRIPTION

Figure 1A:
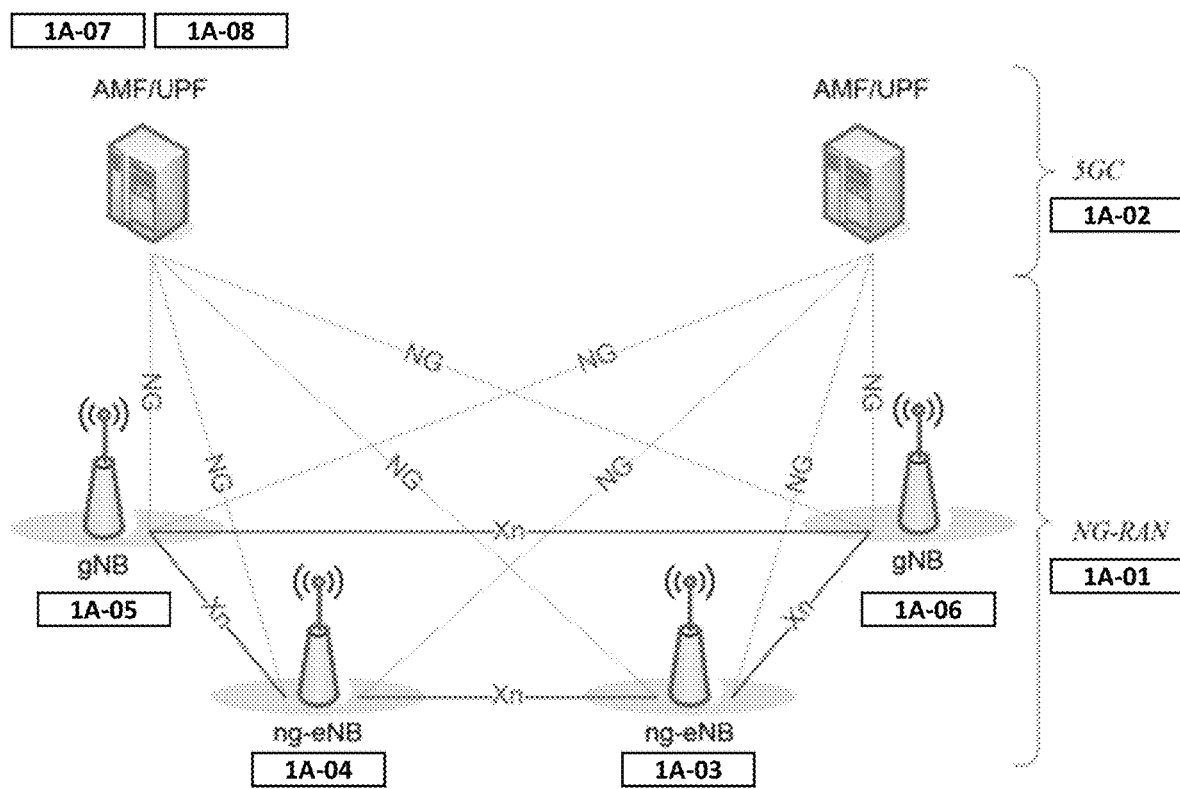
FIG. 1A is a diagram illustrating the architecture of an 5G system and a NG-RAN to which the disclosure may be applied.

Hereinafter, embodiments of the present invention will be described in detail with reference to the accompanying drawings. In addition, in the description of the present invention, if it is determined that a detailed description of a related known function or configuration may unnecessarily obscure the gist of the present invention, the detailed description thereof will be omitted. In addition, the terms to be described later are terms defined in consideration of functions in the present invention, which may vary according to intentions or customs of users and operators. Therefore, the definition should be made based on the content throughout this specification.

The terms used, in the following description, for indicating access nodes, network entities, messages, interfaces between network entities, and diverse identity information is provided for convenience of explanation. Accordingly, the terms used in the following description are not limited to specific meanings but may be replaced by other terms equivalent in technical meanings.

In the following descriptions, the terms and definitions given in the 3GPP standards are used for convenience of explanation. However, the present disclosure is not limited by use of these terms and definitions and other arbitrary terms and definitions may be employed instead.

Table 1 lists the acronyms used throughout the present disclosure.

TABLE 1

| Acronym | Full name |
| --- | --- |
| 5GC | 5G Core Network |
| ACK | Acknowledgement |
| AM | Acknowledged Mode |
| AMF | Access and Mobility Management Function |
| ARQ | Automatic Repeat Request |
| AS | Access Stratum |
| ASN.1 | Abstract Syntax Notation One |
| BSR | Buffer Status Report |
| BWP | Bandwidth Part |

TABLE 1-continued

| Acronym | Full name |
| --- | --- |
| CA | Carrier Aggregation |
| CAG | Closed Access Group |
| CG | Cell Group |
| C-RNTI | Cell RNTI |
| CSI | Channel State Information |
| DCI | Downlink Control Information |
| DRB | (user) Data Radio Bearer |
| DRX | Discontinuous Reception |
| HARQ | Hybrid Automatic Repeat Request |
| IE | Information element |
| LCG | Logical Channel Group |
| MAC | Medium Access Control |
| MIB | Master Information Block |
| NAS | Non-Access Stratum |
| NG-RAN | NG Radio Access Network |
| NR | NR Radio Access |
| PBR | Prioritised Bit Rate |
| PCell | Primary Cell |
| PCI | Physical Cell Identifier |
| PDCCH | Physical Downlink Control Channel |
| PDCP | Packet Data Convergence Protocol |
| PDSCH | Physical Downlink Shared Channel |
| PDU | Protocol Data Unit |
| PHR | Power Headroom Report |
| PLMN | Public Land Mobile Network |
| PRACH | Physical Random Access Channel |
| PRB | Physical Resource Block |
| PSS | Primary Synchronisation Signal |
| PUCCH | Physical Uplink Control Channel |
| PUSCH | Physical Uplink Shared Channel |
| RACH | Random Access Channel |
| RAN | Radio Access Network |
| RAR | Random Access Response |
| RA-RNTI | Random Access RNTI |

TABLE 1-continued

| Acronym | Full name |
| --- | --- |
| RAT | Radio Access Technology |
| RB | Radio Bearer |
| RLC | Radio Link Control |
| RNA | RAN-based Notification Area |
| RNAU | RAN-based Notification Area Update |
| RNTI | Radio Network Temporary Identifier |
| RRC | Radio Resource Control |
| RRM | Radio Resource Management |
| RSRP | Reference Signal Received Power |
| RSRQ | Reference Signal Received Quality |
| RSSI | Received Signal Strength Indicator |
| SCell | Secondary Cell |
| SCS | Subcarrier Spacing |
| SDAP | Service Data Adaptation Protocol |
| SDU | Service Data Unit |
| SFN | System Frame Number |
| S-GW | Serving Gateway |
| SI | System Information |
| SIB | System Information Block |
| SpCell | Special Cell |
| SRB | Signalling Radio Bearer |
| SRS | Sounding Reference Signal |
| SS | Search Space |
| SSB | SS/PBCH block |
| SSS | Secondary Synchronisation Signal |
| SUL | Supplementary Uplink |
| TM | Transparent Mode |
| UCI | Uplink Control Information |
| UE | User Equipment |
| UM | Unacknowledged Mode |
| CRP | Cell Reselection Priority |

Table 2 lists the terminologies and their definition used throughout the present disclosure.

TABLE 2

| Terminology | Definition |
| --- | --- |
| Carrier frequency | center frequency of the cell. |
| Cell | combination of downlink and optionally uplink resources. The linking between the carrier frequency of the downlink resources and the carrier frequency of the uplink resources is indicated in the system information transmitted on the downlink resources. |
| Cell Group | in dual connectivity, a group of serving cells associated with either the MeNB or the SeNB. |
| Cell reselection | A process to find a better suitable cell than the current serving cell based on the system information received in the current serving cell |
| Cell selection | A process to find a suitable cell either blindly or based on the stored information |
| Cell Reselection Priority | Priority of a carrier frequency regarding cell reselection. System Information Block 2 and System Information Block 3 provide the CRP of the serving frequency and CRPs of inter-frequencies respectively. UE consider higher priority frequency for cell reselection if channel condition of the frequency is better than a specific threshold even if channel condition of a lower priority frequency is better than that of the higher priority frequency. |
| Dedicated signalling | Signalling sent on DCCH logical channel between the network and a single UE. |
| Field | The individual contents of an information element are referred to as fields. |
| Frequency layer | set of cells with the same carrier frequency. |
| Global cell identity | An identity to uniquely identifying an NR cell. It is consisted of cellIdentity and plmn-Identity of the first PLMN-Identity in plmn-IdentityList in SIB1. |
| gNB | node providing NR user plane and control plane protocol terminations towards the UE, and connected via the NG interface to the 5GC. |
| Handover | procedure that changes the serving cell of a UE in RRC_CONNECTED. |
| Information element | A structural element containing single or multiple fields is referred as information element. |
| L | The Length field in MAC subheader indicates the length of the corresponding MAC SDU or of the corresponding MAC CE |

TABLE 2-continued

| Terminology | Definition |
| --- | --- |
| LCID | 6 bit logical channel identity in MAC subheader to denote which logical channel traffic or which MAC CE is included in the MAC subPDU |
| Logical channel | a logical path between a RLC entity and a MAC entity. There are multiple logical channel types depending on what type of information is transferred e.g. CCCH (Common Control Channel), DCCH (Dedicate Control Channel), DTCH (Dedicate Traffic Channel), PCCH (Paging Control Channel) |
| NR | NR radio access |
| PCell | SpCell of a master cell group. |
| registered PLMN | PLMN which UE has registered to |
| selected PLMN | PLMN which UE has selected to perform registration procedure |
| equivalent PLMN | PLMN which is equivalent to registered PLMN. UE is informed of list of EPLMNs by AMF during registration procedure |
| PLMN ID Check | the process that checks whether a PLMN ID is the RPLMN identity or an EPLMN identity of the UE. |
| Primary Cell | The MCG cell, operating on the primary frequency, in which the UE either performs the initial connection establishment procedure or initiates the connection re-establishment procedure. |
| Radio Bearer | Logical path between a PDCP entity and upper layer (i.e. SDAP entity or RRC) |
| RLC bearer | RLC and MAC logical channel configuration of a radio bearer in one cell group. |
| RLC bearer configuration | The lower layer part of the radio bearer configuration comprising the RLC and logical channel configurations. |
| Serving Cell | For a UE in RRC_CONNECTED not configured with CA/DC there is only one serving cell comprising of the primary cell. For a UE in RRC_CONNECTED configured with CA/ DC the term 'serving cells' is used to denote the set of cells comprising of the Special Cell(s) and all secondary cells. |
| SpCell | primary cell of a master or secondary cell group. |
| Special Cell | For Dual Connectivity operation the term Special Cell refers to the PCell of the MCG or the PSCell of the SCG, otherwise the term Special Cell refers to the PCell. |
| SRB | Signalling Radio Bearers" (SRBs) are defined as Radio Bearers (RBs) that are used only for the transmission of RRC and NAS messages. |
| SRB0 | SRB0 is for RRC messages using the CCCH logical channel |
| SRB1 | SRB1 is for RRC messages (which may include a piggybacked NAS message) as well as for NAS messages prior to the establishment of SRB2, all using DCCH logical channel; |
| SRB2 | SRB2 is for NAS messages and for RRC messages which include logged measurement information, all using DCCH logical channel. SRB2 has a lower priority than SRB1 and may be configured by the network after AS security activation; |
| SRB3 | SRB3 is for specific RRC messages when UE is in (NG)EN-DC or NR-DC, all using DCCH logical channel |
| SRB4 | SRB4 is for RRC messages which include application layer measurement reporting information, all using DCCH logical channel. |
| DCCH | DCCH is a logical channel to transfer RRC messages after RRC connection establishment |
| Suitable cell | A cell on which a UE may camp. Following criteria apply<br>The cell is part of either the selected PLMN or the registered PLMN or PLMN of the Equivalent PLMN list<br>The cell is not barred<br>The cell is part of at least one TA that is not part of the list of "Forbidden Tracking Areas for Roaming" (TS 22.011 [18]), which belongs to a PLMN that fulfils the first bullet above.<br>The cell selection criterion S is fulfilled (i.e. RSRP and RSRQ are better than specific values |

In the present invention, "trigger" or "triggered" and "initiate" or "initiated" may be used in the same meaning.

In the present invention, a terminal with reduced capability and RedCap UE may be used in the same meaning.

FIG. 1A is a diagram illustrating the architecture of an 5G system and a NG-RAN to which the disclosure may be applied.

5G system consists of NG-RAN 1A-01 and 5GC 1A-02. An NG-RAN node is either:

- a gNB, providing NR user plane and control plane protocol terminations towards the UE; or
- an ng-eNB, providing E-UTRA user plane and control plane protocol terminations towards the UE.

The gNBs 1A-05 or 1A-06 and ng-eNBs 1A-03 or 1A-04 are interconnected with each other by means of the Xn interface. The gNBs and ng-eNBs are also connected by means of the NG interfaces to the 5GC, more specifically to the AMF (Access and Mobility Management Function) and to the UPF (User Plane Function). AMF 1A-07 and UPF 1A-08 may be realized as a physical node or as separate physical nodes.

A gNB 1A-05 or 1A-06 or an ng-eNBs 1A-03 or 1A-04 hosts the functions listed below.

Functions for Radio Resource Management such as Radio Bearer Control, Radio Admission Control, Connection Mobility Control, Dynamic allocation of resources to UEs in uplink, downlink and sidelink (scheduling); and IP and Ethernet header compression, uplink data decompression and encryption of user data stream; and Selection of an AMF at UE attachment when no routing to an MME can be determined from the information provided by the UE; and Routing of User Plane data towards UPF; and Scheduling and transmission of paging messages; and Scheduling and transmission of broadcast information (originated from the AMF or O&M); and Measurement and measurement reporting configuration for mobility and scheduling; and Session Management; and QoS Flow management and mapping to data radio bearers; and Support of UEs in RRC_INACTIVE state; and Radio access network sharing; and Tight interworking between NR and E-UTRA; and Support of Network Slicing.

The AMF 1A-07 hosts the functions such as NAS signaling, NAS signaling security, AS security control, SMF selection, Authentication, Mobility management and positioning management.

The UPF 1A-08 hosts the functions such as packet routing and forwarding, transport level packet marking in the uplink, QoS handling and the downlink, mobility anchoring for mobility etc.

Figure 1B:
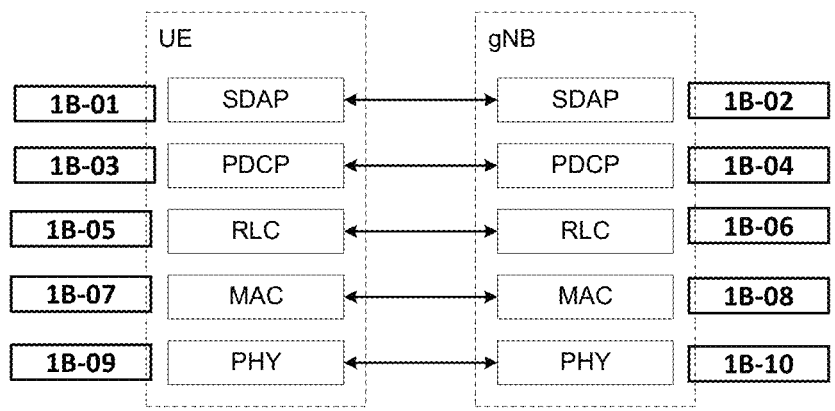
FIG. 1B is a diagram illustrating a wireless protocol architecture in an 5G system to which the disclosure may be applied.
Figure 1B:
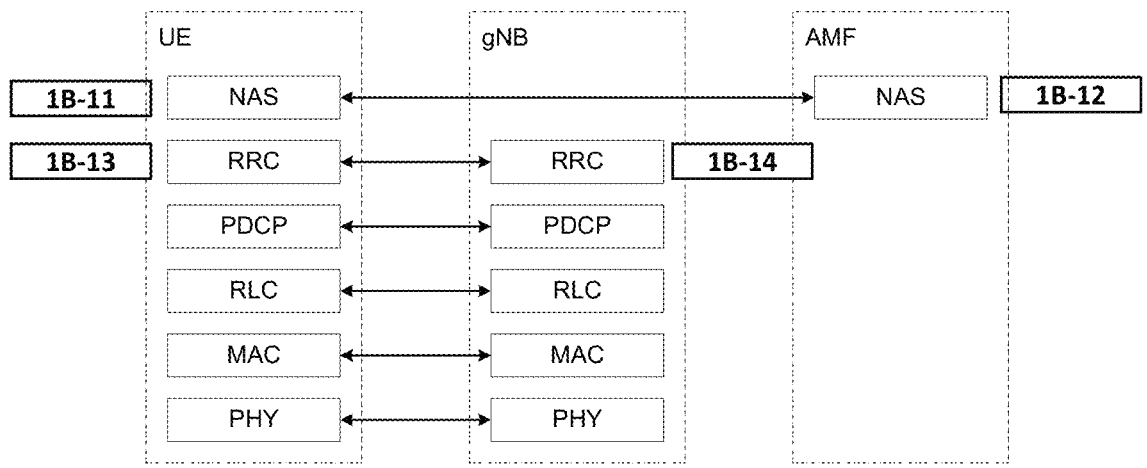

FIG. 1B is a diagram illustrating a wireless protocol architecture in an 5G system to which the disclosure may be applied.

User plane protocol stack consists of SDAP 1B-01 or 1B-02, PDCP 1B-03 or 1B-04, RLC 1B-05 or 1B-06, MAC 1B-07 or 1B-08 and PHY 1B-09 or 1B-10. Control plane protocol stack consists of NAS 1B-11 or 1B-12, RRC 1B-13 or 1B-14, PDCP, RLC, MAC and PHY.

Each protocol sublayer performs functions related to the operations listed in the table 3.

TABLE 3

| Sublayer | Functions |
| --- | --- |
| NAS | authentication, mobility management, security control etc |
| RRC | System Information, Paging, Establishment, maintenance and release of an RRC connection, Security functions, Establishment, configuration, maintenance and release of Signalling Radio Bearers (SRBs) and Data Radio Bearers (DRBs), Mobility, QoS management, Detection of and recovery from radio link failure, NAS message transfer etc. |
| SDAP | Mapping between a QoS flow and a data radio bearer, Marking QoS flow ID (QFI) in both DL and UL packets. |
| PDCP | Transfer of data, Header compression and decompression, Ciphering and deciphering, Integrity protection and integrity verification, Duplication, Reordering and in-order delivery, Out-of-order delivery etc. |
| RLC | Transfer of upper layer PDUs, Error Correction through ARQ, Segmentation and re-segmentation of RLC SDUs, Reassembly of SDU, RLC re-establishment etc. |
| MAC | Mapping between logical channels and transport channels, Multiplexing/demultiplexing of MAC SDUs belonging to one or different logical channels into/from transport blocks (TB) delivered to/from the physical layer on transport channels, Scheduling information reporting, Priority handling between UEs, Priority handling between logical channels of one UE etc. |
| PHY | Channel coding, Physical-layer hybrid-ARQ processing, Rate matching, Scrambling, Modulation, Layer mapping, Downlink Control Information, Uplink Control Information etc. |

A reduced capability UE or RedCap UE has lower performance than a general UE and is used in limited scenarios such as IOT. Compared to a typical terminal having a bandwidth of 100 MHz, a transmission/reception speed of several Gbps, and four or more Rx processing units (Rx branches), RedCap terminals have a bandwidth of 20 MHz, a transmission/reception speed of several tens of Mbps, and two or less Rx processing units.

The present invention provides a method and apparatus for a RedCap UE to access a cell supporting RedCap, receive system information, and perform necessary operations. In particular, the terminal applies search space 0 (Search Space 0, hereinafter SS #0) and control resource set 0 (Control Resource Set 0, hereinafter CORESET #0) in the initial bandwidth part (IBWP) to obtain system information.

Figure 2A:
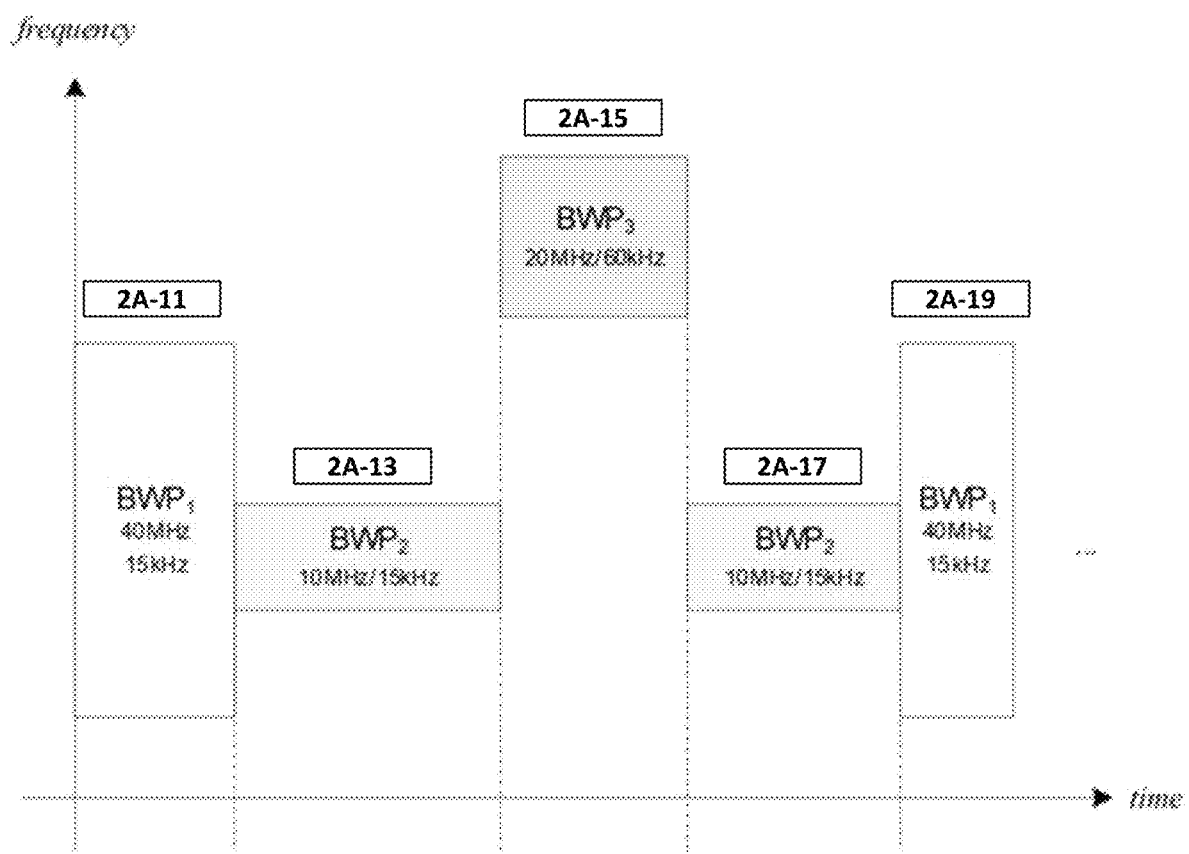
FIG. 2A is a diagram illustrating an example of a bandwidth part.

FIG. 2A is a diagram illustrating an example of a bandwidth part.

With Bandwidth Adaptation (BA), the receive and transmit bandwidth of a UE need not be as large as the bandwidth of the cell and can be adjusted: the width can be ordered to change (e.g. to shrink during period of low activity to save power); the location can move in the frequency domain (e.g. to increase scheduling flexibility); and the subcarrier spacing can be ordered to change (e.g. to allow different services). A subset of the total cell bandwidth of a cell is referred to as a Bandwidth Part (BWP) and BA is achieved by configuring the UE with BWP(s) and telling the UE which of the configured BWPs is currently the active one.

FIG. 2A describes a scenario where 3 different BWPs are configured:
BWP1 with a width of 40 MHz and subcarrier spacing of 15 kHz; 2A-11 or 2A-19
BWP2 with a width of 10 MHz and subcarrier spacing of 15 kHz; 2A-13 or 2A-17
BWP3 with a width of 20 MHz and subcarrier spacing of 60 kHz. 2A-15

Figure 2B:
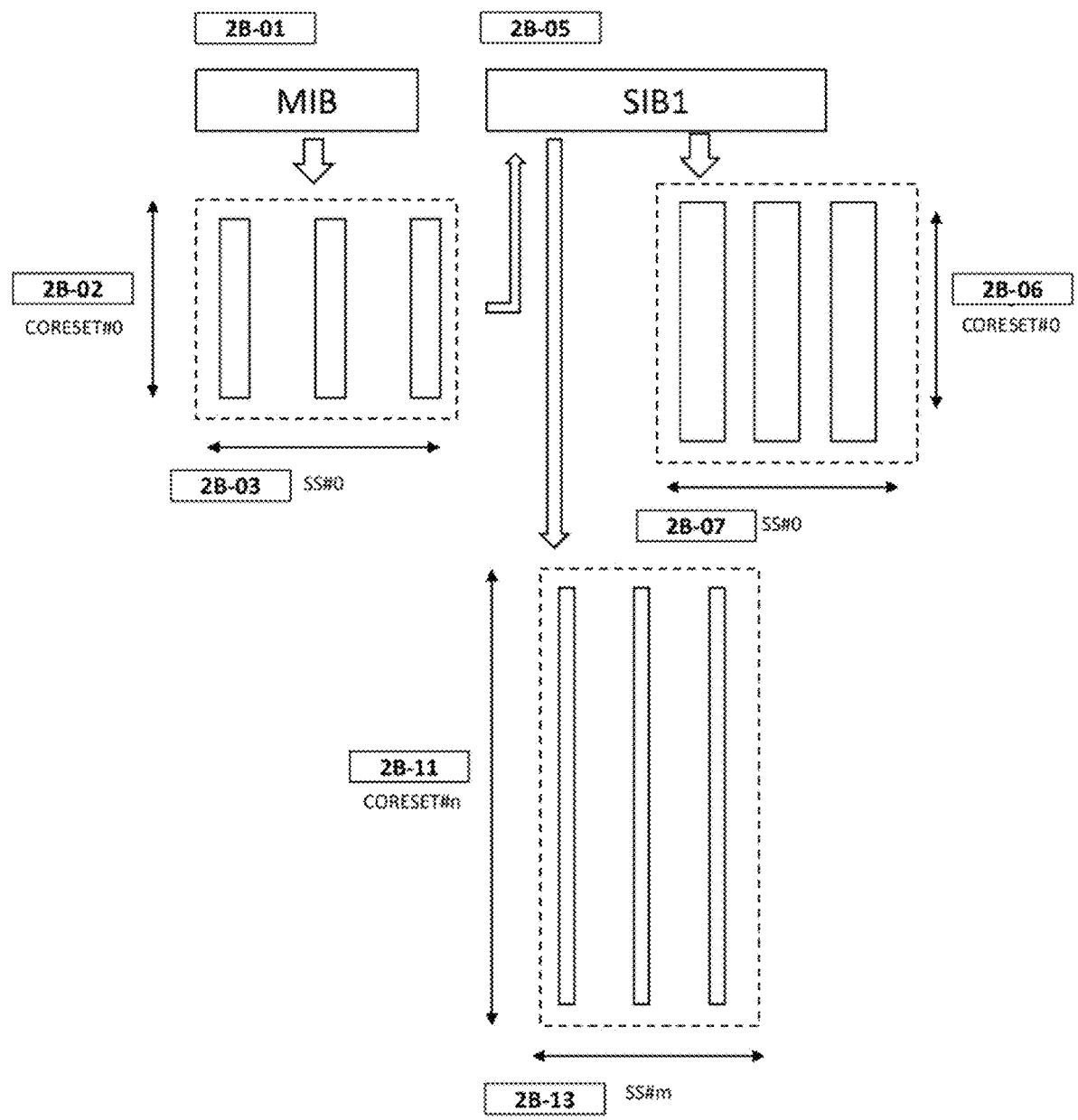
FIG. 2B is a diagram illustrating an example of a search space and a control resource set.

FIG. 2B is a diagram illustrating an example of a search space and a control resource set.

A plurality of SSs may be configured in one BWP. The UE monitors PDCCH candidates according to the SS configuration of the currently active BWP. One SS consists of an SS identifier, a CORESET identifier indicating the associated CORESET, the period and offset of the slot to be monitored, the slot unit duration, the symbol to be monitored in the slot, the SS type, and the like. The information may be explicitly and individually configured or may be configured by a predetermined index related to predetermined values.

One CORESET consists of a CORESET identifier, frequency domain resource information, symbol unit duration, TCI state information, and the like.

Basically, it can be understood that CORESET provides frequency domain information to be monitored by the UE, and SS provides time domain information to be monitored by the UE.

CORESET #0 and SS #0 may be configured in the IBWP. One CORESET and a plurality of SSs may be additionally configured in the IBWP. Upon receiving the MIB 2B-01, the UE recognizes CORESET #0 2B-02 and SS #0 2B-03 for receiving SIB1 using predetermined information included in the MIB. The UE receives SIB1 2B-05 through CORESET #0 2B-02 and SS #0 2B-03. In SIB1, information constituting CORESET #0 2B-06 and SS #0 2B-07 and information constituting another CORESET, for example, CORESET #n 2B-11 and SS #m 2B-13 may be included.

The terminal receives necessary information from the base station before the terminal enters the RRC_CONNECTED state, such as SIB2 reception, paging reception, and random access response message reception by using the CORESETs and SSs configured in SIB1. CORESET #0 2B-02 configured in MIB and CORESET #0 2B-06 configured in SIB1 may be different from each other, and the former is called a first CORESET #0 and the latter is called a second CORESET #0. SS #0 2B-03 configured in MIB and SS #0 2B-07 configured in SIB1 may be different from each other, and the former is referred to as a first SS #0 and the latter is referred to as a second SS #0. SS #0 and CORESET #0 configured for the RedCap terminal are referred to as a third SS #0 and a third CORESET #0. The first SS #0, the second SS #0, and the third SS #0 may be the same as or different from each other. The first CORESET #0, the second CORESET #0, and the third CORESET #0 may be the same as or different from each other. SS #0 and CORESET #0 are each indicated by a 4-bit index. The 4-bit index indicates a configuration predetermined in the standard specification. Except for SS #0 and CORESET #0, the detailed configuration of the remaining SS and CORSESET is indicated by each individual information element.

When the RRC connection is established, additional BWPs may be configured for the UE.

Figure 3:
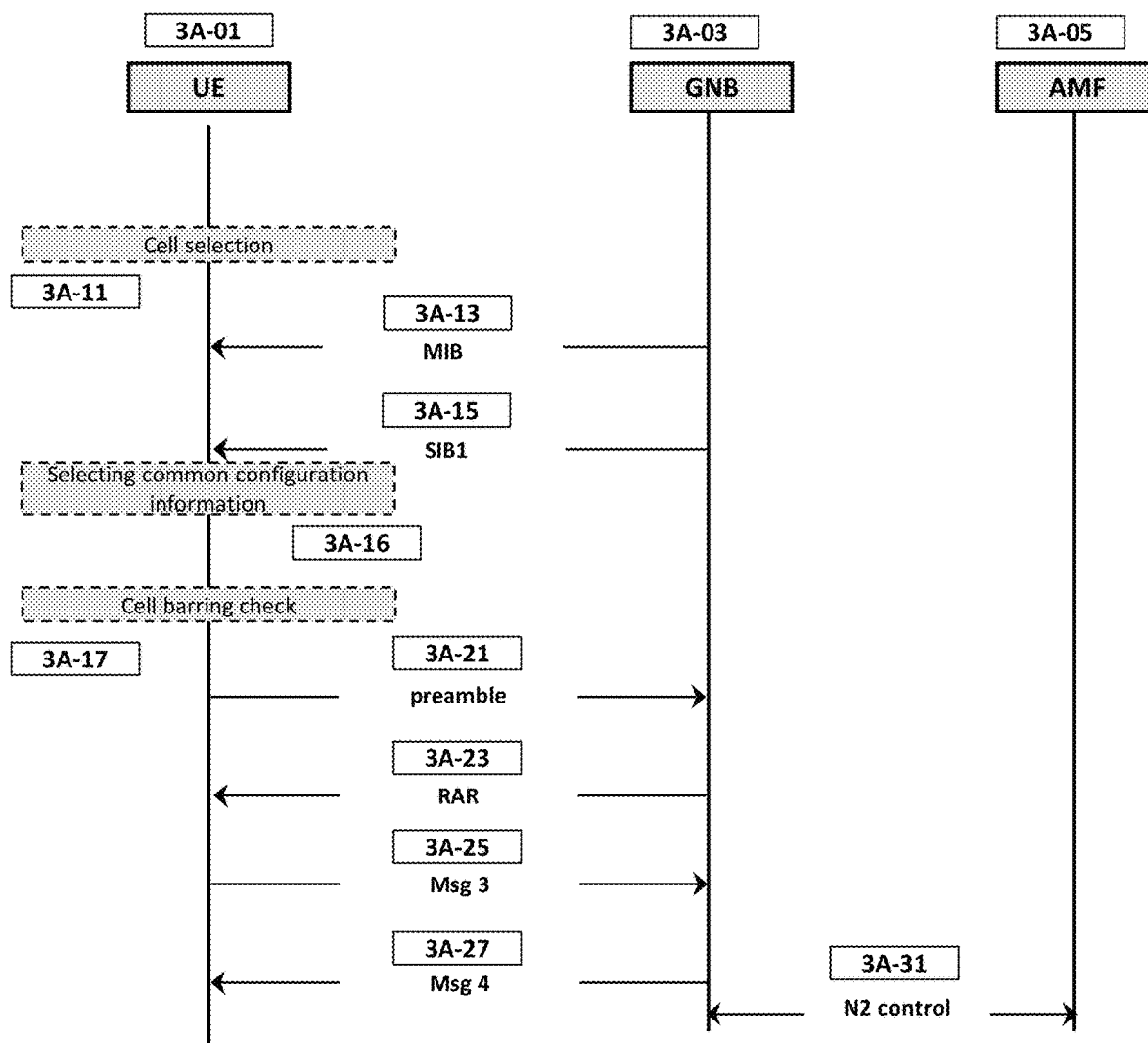
FIG. 3 is a diagram illustrating operations of a terminal and a base station according to an embodiment of the present invention.

FIG. 3 is a diagram illustrating operations of a terminal and a base station according to an embodiment of the present disclosure.

In a network consisting of a RedCap UE 3A-01, a base station 3A-03 and an AMF 3A-05, the RedCap UE receives system information, determines whether to bar a cell, performs cell reselection, monitors a paging message, selects and applies cell common configuration information and transmits and receives RRC control messages.

In step 3A-11, the RedCap UE camps on a cell managed by the base station by performing cell selection or cell reselection. The RedCap UE selects a cell having a good reception signal from among cells of the highest priority frequency in consideration of cell reselection priority and the like.

In step 3A-13, the RedCap UE receives the MIB in the selected cell.

The MIB includes controlResourceSetZero, which is a 4-bit index indicating the configuration of the first CORESET #0, and controlResourceSetZero, which is a 4-bit index, indicating the configuration of the first SS #0. The UE receives SIB1 by applying the frequency domain and time pattern indicated by the first CORESET #0 and the first SS #0.

The MIB includes cellBarred, which is 1-bit information indicating whether or not the cell is barred. cellBarred indicates either barred or notBarred. The UE uses cellBarred to determine whether to bar the cell.

The MIB includes a first intraFreqReselection that is 1-bit information for controlling intra-frequency cell reselection. The first intraFreqReselection is defined as Enumerated {allowed, notAllowed}. Also called IFRI_MIB.

In steps 3A-15, the RedCap UE receives SIB1. The RedCap UE stores the acquired SIB1. SIB1 includes ServingCellConfigCommon, which is common configuration information of a serving cell, and a second intraFreqReselection. The second intraFreqReselection is defined as enumerated with one of Allowed and notAllowed. It is also called IFRI_SIB.

In step 3A-16, the RedCap UE selects one of a plurality of common configuration information included in ServingCellConfigCommon.

The servingCellConfigCommon of SIB1 includes the following information.

TABLE 4

| | |
|---|---|
| DownlinkConfigCommon | This is a common downlink configuration of the serving cell. It consists of subfields such as frequencyInfoDL, initialDownlinkBWP, bcch-Config, and pcch-Config. |
| frequencyInfoDL | It is a basic parameter of a downlink carrier. It consists of subfields such as a frequency band list and carrier bandwidth for each SCS. |
| initialDownlinkBWP | This is the configuration of the second downlink IBWP. It consists of subfields such as BWP, PDCCH-ConfigCommon, and PDSCH-ConfigCommon. The first IBWP has a frequency domain corresponding to the first CORESET#0 of the MIB and has subcarrier spacing indicated by the MIB. The first IBWP is the IBWP indicated by the MIB and used for receiving SIB1, the second IBWP is the IBWP indicated by the SIB1 and used for receiving the SIB2, paging, random access response message, and the like. |
| BWP | It is IE that configures general parameters of BWP. It consists of subfields such as locationAndBandwidth indicating the bandwidth and location of the BWP, and subcarrierSpacing indicating the SCS of the BWP. |
| PDCCH-ConfigCommon | It is the cell-specific PDCCH parameters of the BWP. It consists of subfields such as controlResourceSetZero, commonControlResourceSet, searchSpaceZero, commonSearchSpaceList, searchSpaceOtherSystemInformation, pagingSearchSpace, and ra-SearchSpace. |
| controlResourceSetZero | It is defined as an integer between 0 and 15. Indicates one of the predefined CORESET#0 configurations. The controlResourceSetZero included in the MIB corresponds to the first CORESET#0, and the controlResourceSetZero included in the PDCCH-ConfigCommon of the servingCellConfigCommon of SIB1 corresponds to the second CORESET#0. |
| searchSpaceZero | It is defined as an integer between 0 and 15. Indicates one of the predefined SS#0 configurations. The searchSpaceZero included in the MIB corresponds to the first SS#0, and the controlResourceSetZero included in the PDCCH-ConfigCommon of the servingCellConfigCommon of SIB1 corresponds to the second SS#0. |
| commonControlResourceSet | A common CORESET defined by ControlResourceSet IE. Defines an additional CORESET that can be used for paging reception, random access response reception, system information reception, etc. |
| commonSearchSpaceList | List of common SSs. The common SS may be used for paging reception, random access response reception, system information reception, and the like. |
| searchSpaceOtherSystemInformation | Defined by the SS identifier IE. If it is 0, the second SS#0 is indicated, and if it is a value other than 0, one of the SSs defined in commonSearchSpaceList is indicated. |
| pagingSearchSpace | Defined by the SS identifier IE. If it is 0, the second SS#0 is indicated, and if it is a value other than 0, one of the SSs defined in commonSearchSpaceList is indicated. |
| ra-SearchSpace | Defined by the SS identifier IE. If it is 0, the second SS#0 is indicated. If it is a value other than 0, one of the SSs defined in the commonSearchSpaceList is indicated. |
| PDSCH-ConfigCommon | Cell-specific PDSCH parameters of this BWP. It consists of a pdsch-TimeDomainAllocationList. The pdsch-TimeDomainAllocationList is a list composed of a plurality of pdsch-TimeDomainAllocations. |
| pdsch-TimeDomainAllocation | A time domain relationship between the PDCCH and the PDSCH. It consists of subfields such as K0 and startSymbolAndLength. K0 is the slot offset between the DCI and the scheduled PDSCH. startSymbolAndLength is an index indicating a valid start symbol and length combination. |
| pcch-Config | Configuration related to paging. It consists of sub-fields such as the base station paging period, PF-related parameters, and PO-related parameters. |
| bcch-config | It is a configuration related to system information. It consists of subfields such as modificationPeriodCoeff indicating the length of the modification period. |

TABLE 4-continued

| | |
|---|---|
| UplinkConfigCommonSIB | This is a common uplink configuration of the serving cell. It consists of subfields such as frequencyInfoUL, initialUplinkBWP, and timeAlignmentTimerCommon. |
| frequencyInfoUL | It is a basic parameter of the uplink carrier. It consists of subfields such as a frequency band list and carrier bandwidth for each SCS. |
| initialUplinkBWP | This is the configuration of the second uplink IBWP. It consists of subfields such as BWP, rach-ConfigCommon, pusch-ConfigCommon, and pucch-ConfigCommon. |
| rach-ConfigCommon | This is the cell-specific random access parameter of the BWP. It consists of subfields such as prach-ConfigurationIndex, msg1-FrequencyStart, preambleReceivedTargetPower, ra-ResponseWindow, preambleTransMax, msg1-SubcarrierSpacing, rsrp-ThresholdSSB, and ra-ContentionResolutionTimer. |
| prach-ConfigurationIndex | PRACH configuration index. One PRACH configuration corresponds to pattern information on a PRACH transmission opportunity in the time domain (information indicating in which symbol in which slot of which radio frame PRACH transmission is possible), a transmission format of a preamble, and the like. |
| msg1-FrequencyStart | The offset from PRB0 of the lowest PRACH transmission opportunity. Information indicating a PRACH transmission resource in the frequency domain. PRB0 is the lowest frequency PRB among PRBs of the corresponding carrier. |
| preambleReceivedTargetPower | This is the target power level of the network receiving end. It is a parameter related to transmission power control during the random access procedure. |
| ra-ResponseWindow | The length of the random access response window expressed in the number of slots. |
| preambleTransMax | The maximum number of random access preamble transmissions |
| msg1-SubcarrierSpacing | It is PRACH's SCS. It is commonly applied to general terminals and RedCap UEs. |
| rsrp-ThresholdSSB | SSB selection criteria. The UE performs random access by selecting a preamble corresponding to the selected SSB. |
| ra-ContentionResolutionTimer | This is the initial value of the contention resolution timer. Indicates the number of subframes. |
| pusch-ConfigCommon | Cell-specific PUSCH parameters of this BWP. It consists of subfields like pusch-TimeDomainAllocationList. The pusch-TimeDomainAllocationList is a list composed of a plurality of pusch-TimeDomainAllocations. |
| pusch-TimeDomainAllocation | A time domain relationship between the PDCCH and the PUSCH. It consists of subfields such as K2 and startSymbolAndLength. K2 is the slot offset between the DCI and the scheduled PUSCH. startSymbolAndLength is an index indicating a valid combination of start symbol and length. |
| pucch-ConfigCommon | This is the cell-specific PUCCH parameter of the BWP. It consists of subfields such as pucch-ResourceCommon and p0-nornminal. |
| pucch-ResourceCommon | It is an index corresponding to a cell-specific PUCCH resource parameters. One index corresponds to a PUCCH format, a PUCCH time period, a PUCCH frequency period, a PUCCH code, and the like. |
| p0-norminal | This is a power offset applied during PUCCH transmission. Defined as an integer between -202 and 24 in increments of 2. The unit is dBm. |
| timeAlignmentTimerCommon | This is a timer applied when the UE performs random access for RRC connection establishment procedure and RRC connection re-establishment procedure. When the UE receives the RAR, it starts the timer, and stops the timer when contention fails. |
| tdd-UL-DL-ConfigurationCommon | Cell specific TDD UL/DL configuration. It consists of subfields such as referenceSubcarrierSpacing, pattern1, and pattern2. |
| referenceSubcarrierSpacing | This is the reference SCS used to determine the time domain boundary in the UL-DL pattern. |
| pattern1, pattern2 | TDD Uplink Downlink Pattern. It consists of subfields such as dl-UL-TransmissionPeriodicity, nrofDownlinkSlots, nrofDownlinkSymbols, nrofUplinkSlots, and nrofUplinkSymbols. |

TABLE 4-continued

| | |
|---|---|
| dl-UL-TransmissionPeriodicity | Indicates the period of the DL-UL pattern. |
| nrofDownlinkSlots | Indicates the number of consecutive full DL slots in each DL-UL pattern. |
| nrofDownlinkSymbols | Indicates the number of consecutive DL symbols from the beginning of the slot following the last full DL slot. |
| nrofUplinkSlots | Indicates the number of consecutive full UL slots in each DL-UL pattern. |
| nrofUplinkSymbols | Indicates the number of consecutive UL symbols at the last time point of a slot preceding the first full UL slot |

ServingCellConfigCommon may also include the following information for RedCap UE.

TABLE 5

| | |
|---|---|
| controlResourceSetZero_RedCap | It is defined as an integer between 0 and 15. Indicates one of the predefined CORESET#0 configurations. It corresponds to the third CORESET #0. |
| searchSpaceZero_RedCap | It is defined as an integer between 0 and 15. Indicates one of the predefined SS#0 configurations. It corresponds to the third SS#0. |
| searchSpaceOtherSystemInformation_RedCap | Defined by the SS identifier IE. If it is 0, the third SS#0 is indicateed, if not 0, one of the SSs defined in commonSearchSpaceList is indicateed. |
| ra-SearchSpace_RedCap | Defined by the SS identifier IE. If it is 0, the third SS#0 is indicateed, if not 0, one of the SSs defined in commonSearchSpaceList is indicateed. . |
| prach-ConfigurationIndex_RedCap | PRACH configuration index for RedCap. |
| msg1-FrequencyStart_RedCap | PRACH transmission resource information on the frequency domain for RedCap |
| preambleReceivedTargetPower_RedCap | The target power level of the network receiver for RedCap. |
| ra-ResponseWindow_RedCap | Length of the random access response window for RedCap. |
| preambleTransMax_RedCap | Maximum number of random access preamble transmissions for RedCap |
| rsrp-ThresholdSSB_RedCap | SSB selection criteria for RedCap. |
| ra-ContentionResolutionTimer_RedCap | Initial value of the contention resolution timer for RedCap. |
| intraFreqReselection_RedCap | Controls cell selection/reselection within the frequency of RedCap UE when the highest-priority cell is barred. It is 1-bit information and is defined as Enumerated {Allowed, notAllowed}. Also called IFRI_SIB1. |

IFRI_MIB is defined to be present mandatorily and IFRI_SIB1 is defined to be present optionally. This is to ensure backward compatibility of SIB1.

Instead of defining IEs for RedCap UEs in units of individual IEs, it is also possible to define configuration information related to RedCap UEs in units of IE sets as follows.

ServingCellConfigCommon of SIB1 includes downlink IBWP configuration information and uplink IBWP configuration information.

Downlink IBWP configuration information includes PDCCH-ConfigCommon and PDCCH-ConfigCommon2. PDCCH-ConfigCommon is used by general terminals and RedCap UEs, and PDCCH-ConfigCommon2 is used by RedCap UEs. RedCap UE uses PDCCH-ConfigCommon when only PDCCH-ConfigCommon is included in downlink IBWP configuration information and uses PDCCH-ConfigCommon2 when both PDCCH-ConfigCommon and PDCCH-ConfigCommon2 are included.

PDCCH-ConfigCommon includes controlResourceSetZero, commonControlResourceSet, searchSpaceZero, commonSearchSpaceList, searchSpaceOtherSystemInformation, pagingSearchSpace, and ra-SearchSpace. PDCCH-ConfigCommon2 includes controlResourceSetZero_RedCap, commonControlResourceSet_RedCap, searchSpaceZero_RedCap, commonSearchSpaceList_RedCap, ra-SearchSpace_RedCap.

RedCap UE uses controlResourceSetZero and searchSpaceZero of PDCCH-ConfigCommon if controlResourceSetZero_RedCap and searchSpaceZero_RedCap are not included in PDCCH-ConfigCommon2. That is, it is considered that the same value as the second SS #0 is configured for the third SS #0 and the same value as the second CORESET #0 is configured for the third CORESET #0.

The RedCap UE uses the values indicated in the MIB when controlResourceSetZero_RedCap and searchSpaceZero_RedCap are not included in PDCCH-ConfigCommon2 and controlResourceSetZero and searchSpaceZero are not included in PDCCH-ConfigCommon. That is, it is considered that the same value as the first SS #0 is configured for the third SS #0 and the same value as the first CORESET #0 is configured for the third CORESET #0.

RedCap UE uses ra-SearchSpace of PDCCH-ConfigCommon if ra-SearchSpace_RedCap is not included in PDCCH-ConfigCommon2. That is, it is considered that the same value as ra-SearchSpace is set as ra-SearchSpace_RedCap. The RedCap UE performs a random access procedure by applying the third SS #0 and the third CORESET #0.

The uplink IBWP configuration information includes PUCCH-ConfigCommon and PUCCH-ConfigCommon2. PUCCH-ConfigCommon is used by general UEs and RedCap UEs, and PUCCH-ConfigCommon2 is used by RedCap UEs. RedCap UE uses PUCCH-ConfigCommon when only PUCCH-ConfigCommon is included in uplink IBWP configuration information, and uses PUCCH-ConfigCommon2 when both PUCCH-ConfigCommon and PUCCH-ConfigCommon2 are included.

PUCCH-ConfigCommon2 is used by RedCap UE. PUCCH-ConfigCommon contains pusch-TimeDomainAllocationList. PUCCH-ConfigCommon2 contains pusch-TimeDomainAllocationList_RedCap.

The uplink IBWP configuration information includes RACH-ConfigCommon and RACH-ConfigCommon2. RACH-ConfigCommon is used by general terminals and RedCap UEs, and RACH-ConfigCommon2 are used by RedCap UEs. RedCap UE uses RACH-ConfigCommon when only RACH-ConfigCommon is included in uplink IBWP configuration information, and uses RACH-ConfigCommon2 when both RACH-ConfigCommon and RACH-ConfigCommon2 are included.

RACH-ConfigCommon includes prach-ConfigurationIndex, msg1-FrequencyStart, preambleReceivedTargetPower, ra-ResponseWindow, preambleTransMax, msg1-SubcarrierSpacing, rsrp-ThresholdSSB, and ra-ContentionResolutionTimer.

RACH-ConfigCommon2 includes prach-ConfigurationIndex_RedCap, msg1-FrequencyStart_RedCap, preambleReceivedTargetPower_RedCap, ra-ResponseWindow_RedCap, preambleTransMax_RedCap, rsrp-ThresholdSSB_RedCap, ra-ContentionResolutionTimer_RedCap. msg1-SubcarrierSpacing included in RACH-ConfigCommon is applied to both normal UEs and RedCap UEs. In other words, the RedCap UE applies msg1-FrequencyStart included in RACH-ConfigCommon2 and msg1-SubcarrierSpacing included in RACH-ConfigCommon when applying msg1 frequency-related information.

If RACH-ConfigCommon2 does not contain prach-ConfigurationIndex_RedCap, msg1-FrequencyStart_RedCap, preambleReceivedTargetPower_RedCap, ra-ResponseWindow_RedCap, preambleTransMax_RedCap, msg1-SubcarrierSpacing_RedCap, rsrp-ThresholdSSB_RedCap, ra-ContentionResolutionTimer_RedCap, RedCap UE uses a same values of prach-ConfigurationIndex, a same values of msg1-FrequencyStart, a same values of preambleReceivedTargetPower, a same values of ra-ResponseWindow, a same values of preambleTransMax, a same values of msg1-SubcarrierSpacing, a same values of rsrp-ThresholdSSB, a same values of ra-ContentionResolutionTimer in RACH-ConfigCommon respectively.

In another method, the ServingCellConfigCommon of SIB1 includes the first downlink IBWP configuration information, the first uplink IBWP configuration information, the second downlink IBWP configuration information, the second uplink IBWP configuration information, and tdd-UL-DL-ConfigurationCommon. The first downlink IBWP configuration information and the first uplink IBWP configuration information are information for a terminal with general capability, and the second downlink IBWP configuration information and the second uplink IBWP configuration information are information for a RedCap UE. tdd-UL-DL-ConfigurationCommon is information that is commonly applied to a UE with general capability and a RedCap UE.

The first uplink IBWP configuration information includes pucch-ConfigCommon and timeAlignmentTimerCommon. The second uplink IBWP configuration information may include pucch-ConfigCommon_RedCap. The pucch-ConfigCommon may include a first pucch-ResourceCommon and a first p0-norminal. The pucch-ConfigCommon_RedCap may include a second pucch-ResourceCommon and a second p0-norminal. pucch-ConfigCommon is information for a normal UE. pucch-ConfigCommon_RedCap is information for RedCap UE. timeAlignmentTimerCommon is information commonly applied to normal UE and RedCap UE.

The RedCap UE transmits the preamble and initiates timeAlignmentTimerCommon upon reception of the RAR. Upon receiving Msg 4, the UE transmits a HARQ ACK by applying a predetermined pucch-ResourceCommon and a predetermined p0-normal.

If both the second pucch-ResourceCommon and the first pucch-ResourceCommon exist, the time/frequency/code resource for transmitting the HARQ ACK is determined by applying the second pucch-ResourceCommon. If only the first pucch-ResourceCommon exists, the time/frequency/code resource for transmitting the HARQ ACK is determined by applying the first pucch-ResourceCommon.

When both the second p0-norminal and the first p0-norminal exist, the second p0-norminal is applied to determine a power offset to be applied to the HARQ ACK. If only the first p0-norminal exists, the power offset to be applied to the HARQ ACK is determined by applying the first p0-norminal. If neither the second p0-norminal nor the p0-norminal exist, a power offset to be applied to the HARQ ACK is determined by applying a predetermined value. The predetermined value may be, for example, 2 dBm.

In step 3A-17, the RedCap UE determines whether the current cell is a barred cell or an allowed cell, in consideration of MIB and SIB1.

Regarding cell barring, the RedCap UE determines that the current cell is not barred if all of the following conditions are satisfied. The conditions below are defined so that the RedCap UE camps on the cell only when it can operate properly in the cell.

<Cell Allowance Conditions>

0: The received MIB's cellBarred is set to notBarred.
1: IFRI_SIB1 exists (or is included) in the received SIB1. This is because the absence of IFRI_SIB1 means that the corresponding cell does not consider the operation of the RedCap UE, and the presence of IFRI_SIB1 means that the corresponding cell is a cell that considers the operation of the RedCap UE.
2: If the current cell is TDD cell, the UE supports one or more of the frequency bands indicated in the frequencyBandList for downlink in the received SIB1 for TDD, or one or more of the frequency bands indicated in the frequencyBandList for uplink in the received SIB1 for FDD, and they are not downlink only bands, and
3: The UE supports an uplink channel bandwidth with a maximum transmission bandwidth configuration fulfilling following conditions: It is smaller than or equal to the uplink carrierBandwidth indicated in SIB1 and it is wider than or equal to the bandwidth of the initial uplink BWP
4: the UE supports a downlink channel bandwidth with a maximum transmission bandwidth configuration fulfilling following conditions: It is smaller than or equal to the downlink carrierBandwidth indicated in SIB1 it is wider than or equal to the bandwidth of the initial downlink BWP 5: trackingAreaCode is provided in SIB1 for the selected PLMN or the registered PLMN or PLMN of the equivalent PLMN list For example, if trackingAreaCode x is included in SIB1 and trackingAreaCode related to the registered PLMN of the terminal is also x, condition 5 is satisfied. The trackingAreaCode related to the PLMN is provided to the terminal by the AMF during the registration procedure with the terminal.

The RedCap UE, which determines that the current cell is not barred, performs the following operation.

<Operation of Terminal after Receiving SIB1 in Non-Prohibited Cell>

1: Apply the configuration included in the servingCell-ConfigCommon. More specifically, the UE applies the TDD-UL-DL configuration to determine a downlink slot, an uplink slot, a downlink symbol, and an uplink symbol, and applies a PDSCH configuration selected from among a plurality of PDSCH-ConfigCommon to receive a PDSCH, and applies a PUSCH configuration selected from among a plurality of PUSCH-ConfigCommon to transmit a PUSCH.

2: A specified PCCH configuration is applied. The specified PCCH configuration is no SDAP, no PDCP, and RLC TM. A paging message is received by applying the PCCH configuration.

3: If a valid SIB is stored, the stored SIB is used, and if a valid SIB is not stored, a related system information message (SI message) is acquired The UE also receives subsequent system information, for example, SIB2, SIB3, SIB4, etc. in the not barred cell. SIB2 includes parameters for intra-frequency cell reselection. SIB3 includes other parameters for intra-frequency cell reselection. SIB4 contains parameters for cell reselection between frequencies.

The RedCap UE regards the current serving cell as a barred cell in the cases listed in the table below and performs an appropriate operation according to the situation.

TABLE 6

| Case | Situation | RedCap UE operation |
|---|---|---|
| 1 | MIB reception failure | The current cell is considered as a barred cell. The current cell is excluded from cell selection/cell reselection candidates for 300 seconds. It is assumed that both IFRI_MIB and IFRI_SIB1 are allowed. That is, neighboring cells of the corresponding frequency may be included in the cell selection/cell reselection candidates. |
| 2 | Successful reception of MIB with cellBarred set to notBarred. SIB1 reception failure | The current cell is considered as a barred cell. Excludes the current cell from candidates for cell selection/cell reselection for 300 seconds. If the received IFRI_MIB is allowed, IFRI_SIB1 is considered as allowed, and neighboring cells of the corresponding frequency may be included in the cell selection/cell reselection candidates. If the received IFRI_MIB is NotAllowed, IFRI_SIB1 is also considered as NotAllowed, and neighboring cells of the corresponding frequency are excluded from cell selection/cell reselection candidates. |
| 3 | Successful reception of MIB with cellBarred set to Barred. | The current cell is considered a barred cell. Excludes the current cell from candidates for cell selection/cell reselection for 300 seconds. If the received IFRI_MIB is allowed, IFRI_SIB1 is considered as allowed, and neighboring cells of the corresponding frequency may be included in the cell selection/cell reselection candidates. If the received IFRI_MIB is NotAllowed, IFRI_SIB1 is also considered as NotAllowed, and neighboring cells of the corresponding frequency are excluded from the cell selection/cell reselection candidates. The general terminal does not receive SIB1. The RedCap UE may receive SIB1 instead of referring to IFRI_MIB, and may exclude or include neighboring cells of the corresponding frequency from cell selection/cell reselection candidates according to the received value of IFRI_SIB1. |
| 4 | Successful MIB reception with cellBarred set to notBarred. SIB1 reception without IFRI_SIB1 | The current cell is considered as a barred cell. Excludes the current cell from candidates for cell selection/cell reselection for 300 seconds. Regardless of the value of the received IFRI_MIB, IFRI_SIB1 may be considered as NotAllowed and neighboring cells of the corresponding frequency may be excluded from cell selection/cell reselection candidates. |

TABLE 6-continued

| Case | Situation | RedCap UE operation |
|---|---|---|
| 5 | Successfully received MIB with cellBarred set to notBarred. Received SIB1 with IFRI_SIB1 The bandwidth supported by the terminal is less than the bandwidth of the IBWP. | The current cell is considered a barred cell. Excludes the current cell from candidates for cell selection/cell reselection for 300 seconds. According to the received IFRI_SIB value, neighboring cells of the corresponding frequency are included or excluded from the cell selection/cell reselection candidates. |
| 6 | Successful reception of MIB with cellBarred set to notBarred. Received SIB1 with IFRI_SIB1 The bandwidth supported by the terminal is greater than or equal to the bandwidth of the IBWP. There is no TrackingAreaCode matching the TrackingAreaCode received from SIB1. | The current cell is considered a barred cell. Excludes the current cell from candidates for cell selection/cell reselection for 300 seconds. Regardless of the received IFRI values, both IFRI_MIB and IFRI_SIB1 are considered as NotAllowed and neighboring cells of the corresponding frequency are excluded from cell selection/cell reselection candidates. |

The reason why the RedCap UE operates as described above is to prevent camp-on in a cell that does not support the RedCap function and to appropriately control whether or not to reselect cells for cells of the same frequency. If there is no IFRI to be referred to as in case 1, both IFRIs may be assumed to be a predetermined value and may be operated accordingly. Alternatively, if reception of IFRI_SIB1 fails as in case 2, IFRI_MIB may be referred to.

The RedCap UE may be given two IFRI parameters: IFRI_MIB and IFRI_SIB1. RedCap UE considers two parameters and determines whether to allow intra-frequency reselection as shown in the table below.

notAllowed). This is because, since cells of the same frequency in the same region are highly likely to be configured identically, if IFRI_SIB1 is not provided in the current cell, it is highly likely that IFRI_SIB1 is not provided in other cells as well. Alternatively, If IFRI_SIB1 is preconfigured to be considered as Allowed when UE has received SIB1 from the base station but IFRI_SIB1 is not included, IFRI_SIB1 is considered as Allowed.

If MIB reception fails, IFRI_MIB cannot be received.

If IFRI_SIB1 is Allowed, the RedCap UE may select or reselect other cells of the same frequency as the barred cell if the cell reselection selection criteria are fulfilled

TABLE 7

| IFRI_MIB | IFRI_SIB1 | RedCap UE operation | Note |
|---|---|---|---|
| Reception failure | Reception failure | IFRI_SIB1 is considered as Allowed | |
| Allowed | Reception failure | IFRI_SIB1 is considered as Allowed | IFRI_SIB1 considered as the same value as IFRI_MIB |
| Allowed | Not Present | IFRI_SIB1 is considered as NotAllowed | It is determined that RedCap is not supported in the corresponding frequency. |
| Allowed | Allowed | IFRI_SIB1 is considered as Allowed | the received IFRI_SIB1 is applied as it is |
| Allowed | NotAllowed | IFRI_SIB1 is considered as NotAllowed | the received IFRI_SIB1 is applied as it is |
| NotAllowed | Reception failure | IFRI_SIB1 is considered as NotAllowed | IFRI_SIB1 considered as the same value as IFRI_MIB |
| NotAllowed | Not Present | IFRI_SIB1 is considered as NotAllowed | It is determined that RedCap is not supported in the corresponding frequency. |
| NotAllowed | Allowed | IFRI_SIB1 is considered as Allowed | the received IFRI_SIB1 is applied as it is |
| NotAllowed | NotAllowed | IFRI_SIB1 is considered as NotAllowed | the received IFRI_SIB1 is applied as it is |

The RedCap UE applies the received IFRI_SIB1, if both IFRI_MIB and IFRI_SIB1 are received.

The RedCap UE considers that IFRI_SIB1 is Allowed If neither IFRI_MIB nor IFRI_SIB1 are received.

If the RedCap UE receives IFRI_MIB but does not receive IFRI_SIB1, it determines IFRI_SIB1 by distinguishing whether SIB1 reception has failed or IFRI_SIB1 is not included in SIB1. If the reception of SIB1 is unsuccessful, the UE considers that IFRI_SIB1 is the same as IFRI_MIB. If SIB1 is received but IFRI_SIB1 is not included, the UE considers that IFRI_SIB1 is a predetermined value (eg, If IFRI_SIB1 is NotAllowed, for 300 seconds the RedCap UE does not select or reselect other cells of the same frequency as the barred cell, and excludes them from candidates for cell selection/reselection.

If IFRI_SIB1 is NotAllowed, the RedCap UE sets the cell reselection priority of the frequency of the barred cell for 300 seconds to the lowest priority. The RedCap UE performs cell reselection for frequencies other than the barred cell frequency. At this time, the RedCap UE performs cell reselection by applying the cell reselection priority indicated in the system information received from an NR cell other than the first NR cell.

A UE camped on a not barred cell and prepares to perform random access in order to perform a necessary procedure. The UE refers to the received ServingCellConfigCommon.

In steps 3A-21, the RedCap UE transmits a preamble to the base station.

If both prach-ConfigurationIndex_RedCap and prach-ConfigurationIndex are included in rach-ConfigCommon (or ServingCellConfigCommon), the RedCap UE applies prach-ConfigurationIndex_RedCap to determine a radio frame, subframe, slot, symbol and preamble format in which preamble transmission is possible. If only prach-ConfigurationIndex is included in rach-ConfigCommon (or in ServingCellConfigCommon), RedCap UE determines radio frame, subframe, slot, symbol and preamble format in which preamble transmission is possible by applying prach-ConfigurationIndex.

If both msg1-FrequencyStart_RedCap and msg1-FrequencyStart are included in rach-ConfigCommon (or ServingCellConfigCommon), the RedCap UE applies msg1-FrequencyStart_RedCap to determine a frequency region in which preamble transmission is possible. If only msg1-FrequencyStart is included in rach-ConfigCommon (or ServingCellConfigCommon), RedCap UE applies msg1-FrequencyStart to determine a frequency range in which preamble transmission is possible.

RedCap UE selects SSB by applying rsrp-ThresholdSSB_RedCap if both rsrp-ThresholdSSB_RedCap and rsrp-ThresholdSSB are included in rach-ConfigCommon (or in ServingCellConfigCommon). RedCap UE selects SSB by applying rsrp-ThresholdSSB if only rsrp-ThresholdSSB is included in rach-ConfigCommon (or ServingCellConfigCommon). The terminal selects an SSB having the highest received signal strength among SSBs having a received signal strength higher than the threshold value. The UE selects a preamble/PRACH transmission opportunity (Occasion) corresponding to the selected SSB and transmits the preamble.

After transmitting the preamble, the UE monitors whether a random access response message is received during the random access response window, and if not received, retransmits the preamble. As the maximum number of preamble retransmissions, the UE applies preambleTransMax_RedCap when both preambleTransMax_RedCap and preambleTransMax are included in ServingCellConfigCommon, and applies preambleTransMax when only preambleTransMax is included. The UE applies msg1-SubcarrierSpacing included in rach-ConfigCommon when transmitting the preamble.

One ServingCellConfigCommon may include two prach-ConfigurationIndex, two msg1-FrequencyStart, two rsrp-ThresholdSSB, two preambleTransMax and one msg1-SubcarrierSpacing for Msg1 transmission. One of the two prach-ConfigurationIndex, one of the two msg1-FrequencyStart, one of the two rsrp-ThresholdSSB, and one of the two preambleTransMax apply only to RedCap UEs, and msg1-SubcarrierSpacing is applied to both RedCap UEs and non-RedCap UEs. Msg 1 is the preamble.

In steps 3A-23, a random access response message is received from the base station. The random access response message includes information such as an uplink grant for Msg 3 transmission, a time domain allocation indicator, and a temporary identifier of the terminal.

The random access response message is addressed by the RA-RNTI. The terminal receives a random access response message by monitoring a predetermined SS in a predetermined CORESET in the random access window time period.

If ServingCellConfigCommon includes controlResourceSetZero, searchSpaceZero, ra-SearchSpace, controlResourceSetZero_RedCap, searchSpaceZero_RedCap, and ra-SearchSpace_RedCap and If ra-SearchSpace_RedCap indicates 0, RedCap UE applies 3rd CORESET #0 and 3rd SS #0 to RA-Monitor the RNTI and receive a random access response message.

If only controlResourceSetZero, searchSpaceZero, and ra-SearchSpace are included in servingCellConfigCommon and If ra-SearchSpace indicates 0, the RedCap UE applies the 2nd CORESET #0 and the 2nd SS #0 to monitor the RA-RNTI and receive a random access response message.

If controlResourceSetZero, searchSpaceZero, ra-SearchSpace, controlResourceSetZero_RedCap, searchSpaceZero_RedCap, and ra-SearchSpace_RedCap are all included in servingCellConfigCommon and if ra-SearchSpace_RedCap indicates a value other than 0, the RedCap UE applies the SS having the indicated identifier and the CORESET associated with the SS to monitor RA-RNTI and receive a random access response message.

If only controlResourceSetZero, searchSpaceZero and ra-SearchSpace are included in servingCellConfigCommon and if ra-SearchSpace indicates a value other than 0, the RedCap UE applies the SS having the indicated identifier and the CORESET associated with the SS to monitor RA-RNTI and receive a random access response message.

If both ra-ResponseWindow and ra-ResponseWindow_RedCap are included in ServingCellConfigCommon, the RedCap UE determines the length of the random access response window by applying ra-ResponseWindow_RedCap.

If only ra-ResponseWindow is included in ServingCellConfigCommon, RedCap UE determines the length of the random access response window by applying ra-ResponseWindow.

Upon receiving the random access response, the RedCap UE starts tlmeAlignmentTimer and generates a MAC PDU to transmit Msg 3 to the base station. The MAC PDU includes an uplink RRC control message such as RRCRequest.

In step 3A-25, the RedCap UE transmits Msg 3 to the base station and starts the contention resolution timer. If servingCellConfigCommon contains both ra-ConttentionResolutionTimer and ra-ContentionResolutionTimer_RedCap, the RedCap UE sets the contention resolution timer to ra-ContentionResolutionTimer_RedCap. If servingCellConfigCommon contains only ra-ConttentionResolutionTimer, RedCap UE sets contention resolution timer to ContentionResolutionTimer.

Msg 3 transmission time is determined by the time domain allocation indicator of the random access response message. The RedCap UE determines the start time and transmission duration of the PUSCH to which Msg 3 is to be transmitted according to the PUSCH time domain allocation entry, indicated by a time domain allocation indicator, of a specific list from among a pusch-TimeDomainAllocationList, a second pusch-5 TimeDomainAllocationList and a default list.

In steps 3A-27, the RedCap UE receives Msg 4 from the base station. Msg 4 includes a downlink RRC control message such as RRCSetup.

The RedCap UE determines a transmission resource for transmitting the HARQ ACK for Msg 4 by selecting one of the first PUCCH common resource information (pucch- ResourceCommon) and the second PUCCH common resource information (pucch-ResourceCommon).

The RedCap UE determines the nominal power offset to be applied to HARQ ACK transmission for Msg 4 by selecting one of a nominal power offset (p0-normal) included in the first PUCCH common configuration information (pucch-ConfigCommon) and a nominal power offset (p0-norminal) included in the second PUCCH common configuration information (pucch-ConfigCommon) and a nominal power offset fixed to a predetermined value.

The RedCap UE and the base station that have transmitted and received the RRCRequest message and the RRCSetup message establish an RRC connection.

The base station and the AMF may transmit/receive various NAS messages and control messages to the UE for which the RRC connection is configured in steps 3A-31.

The RedCap UE and the base station can exchange configuration information and the like through RRC connection, configure a bearer, and then transmit/receive data.

In ServingCellConfigCommon of SIB1, PDCCH-ConfigCommon2 is located behind PDCCH-ConfigCommon. In ServingCellConfigCommon of SIB1, PUCCH-ConfigCommon2 is located behind PUCCH-ConfigCommon. In ServingCellConfigCommon of SIB1, RACH-ConfigCommon2 is located behind RACH-ConfigCommon.

In ServingCellConfigCommon of SIB1, the second downlink IBWP configuration information is located behind the first downlink IBWP configuration information. In ServingCellConfigCommon of SIB1, the second uplink IBWP configuration information is located behind the first uplink IBWP configuration information. In ServingCellConfigCommon of SIB1, controlResourceSetZero_RedCap is located behind controlResourceSetZero. In ServingCellConfigCommon of SIB1, searchSpaceZero_RedCap is located behind searchSpaceZero. In ServingCellConfigCommon of SIB1, ra-SearchSpace_RedCap is located behind ra-SearchSpace. The order of various pieces of information is defined as described above in order to maintain backward compatibility with a terminal or a base station of a previous release.

Figure 4:
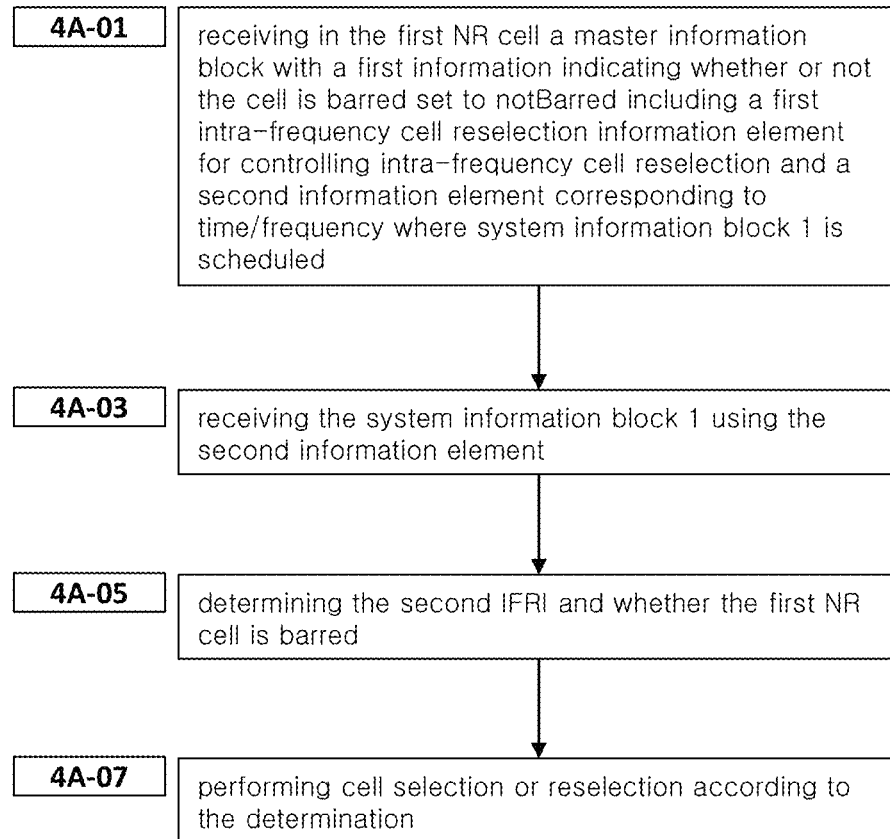
FIG. 4 is a flow diagram illustrating an operation of a terminal.

FIG. 4 is a diagram illustrating an operation of a terminal.

In step 4A-01, the reduced capability terminal receives in the first NR cell a master information block with a first information indicating whether or not the cell is barred set to notBarred including a first intra-frequency cell reselection information element for controlling intra-frequency cell reselection and a second information element corresponding to time/frequency where system information block 1 is scheduled.

In step 4A-03, the reduced capability terminal receives the system information block 1 using the second information element.

In step 4A-05, the reduced capability terminal determines the second IFRI and whether the first NR cell is barred.

In step 4A-07, the reduced capability terminal performs cell selection or reselection according to the determination.

If the reduced capability terminal does not receive SIB1 in the first NR cell, reduced capability terminal determines that the first NR cell is a barred cell, excludes the first NR cell from the candidates for cell selection and cell reselection for 300 seconds, consider the second IFRI is identical to the first IFRI and determined whether to include or exclude the second NR cell of the same frequency as the first NR cell as a candidate for cell selection/re selection.

If the SIB1 received in the first NR cell does not include the second IFRI, reduced capability terminal determines that the first NR cell is a barred cell, excludes the first NR cell from the candidates for cell selection and cell reselection for 300 seconds, consider the second IFRI is set to notAllowed and determined to exclude the second NR cell of the same frequency as the first NR cell as a candidate for cell selection/reselection.

Figure 5A:
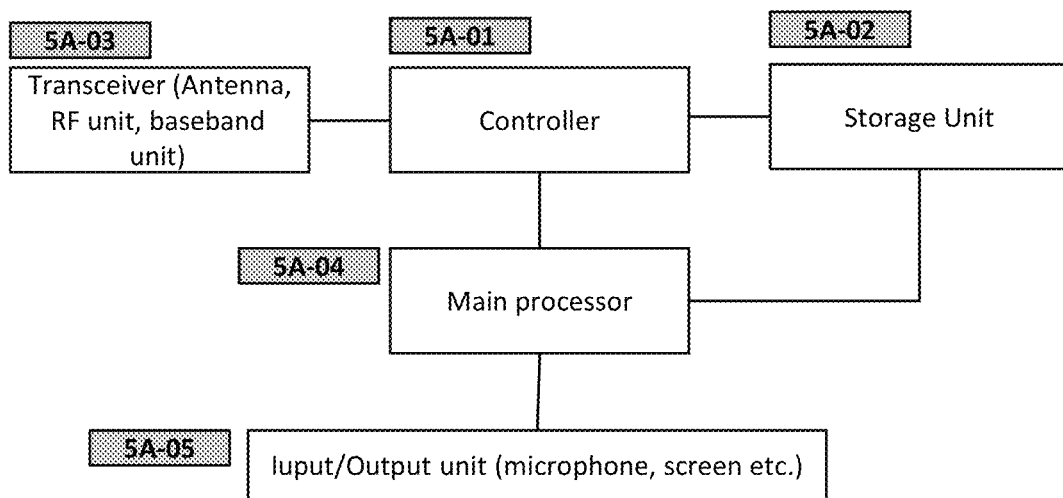
FIG. 5A is a block diagram illustrating the internal structure of a UE to which the disclosure is applied.

In order to ensure backward compatibility with the previous release base station or terminal, the first IFRI IE is defined as a mandatory existence indicating one of Allowed and notAllowed, and the second IFRI IE is defined as an optional existence indicating one of Allowed and notAllowed. FIG. 5A is a block diagram illustrating the internal structure of a UE to which the disclosure is applied.

Referring to the diagram, the UE includes a controller 5A-01, a storage unit 5A-02, a transceiver 5A-03, a main processor 5A-04 and I/O unit 5A-05.

The controller 5A-01 controls the overall operations of the UE in terms of mobile communication. For example, the controller 5A-01 receives/transmits signals through the transceiver 5A-03. In addition, the controller 5A-01 writes and reads data in the storage unit 5A-02. To this end, the controller 5A-01 includes at least one processor. For example, the controller 5A-01 may include a communication processor (CP) that performs control for communication and an application processor (AP) that controls the upper layer, such as an application program. The controller controls storage unit and transceiver such that UE operations illustrated in FIG. 3 and FIG. 4 are performed.

The storage unit 5A-02 stores data for operation of the UE, such as a basic program, an application program, and configuration information. The storage unit 5A-02 provides stored data at a request of the controller 5A-01.

The transceiver 5A-03 consists of a RF processor, a baseband processor and plurality of antennas. The RF processor performs functions for transmitting/receiving signals through a wireless channel, such as signal band conversion, amplification, and the like. Specifically, the RF processor up-converts a baseband signal provided from the baseband processor into an RF band signal, transmits the same through an antenna, and down-converts an RF band signal received through the antenna into a baseband signal. The RF processor may include a transmission filter, a reception filter, an amplifier, a mixer, an oscillator, a digital-to-analog converter (DAC), an analog-to-digital converter (ADC), and the like. The RF processor may perform MIMO and may receive multiple layers when performing the MIMO operation. The baseband processor performs a function of conversion between a baseband signal and a bit string according to the physical layer specification of the system. For example, during data transmission, the baseband processor encodes and modulates a transmission bit string, thereby generating complex symbols. In addition, during data reception, the baseband processor demodulates and decodes a baseband signal provided from the RF processor, thereby restoring a reception bit string.

The main processor 5A-04 controls the overall operations other than mobile operation. The main processor 5A-04 process user input received from I/O unit 5A-05, stores data in the storage unit 5A-02, controls the controller 5A-01 for required mobile communication operations and forward user data to I/O unit (905).

I/O unit 5A-05 consists of equipment for inputting user data and for outputting user data such as a microphone and a screen. I/O unit 5A-05 performs inputting and outputting user data based on the main processor's instruction.

Figure 5B:
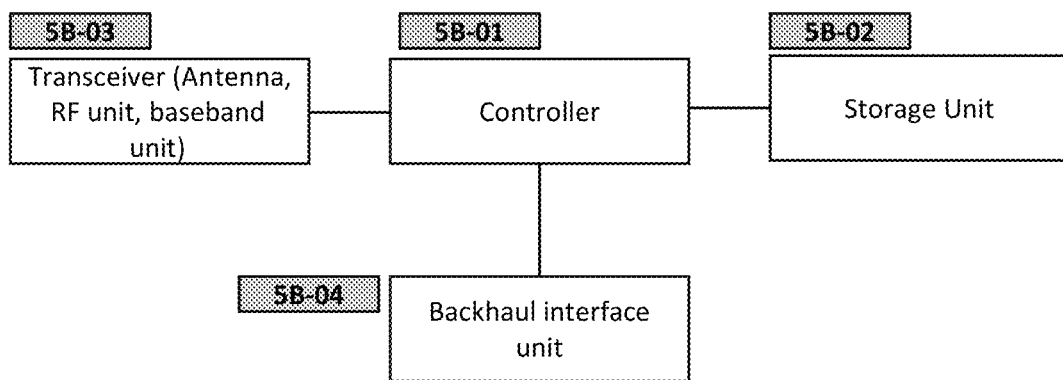
FIG. 5B is a block diagram illustrating the configuration of a base station according to the disclosure.

FIG. 5B is a block diagram illustrating the configuration of a base station according to the disclosure.

As illustrated in the diagram, the base station includes a controller 5B-01, a storage 5 unit 5B-02, a transceiver 5B-03 and a backhaul interface unit 5B-04.

The controller 5B-01 controls the overall operations of the main base station. For example, the controller 5B-01 receives/transmits signals through the transceiver 5B-03, or through the backhaul interface unit 5B-04. In addition, the controller 5B-01 records and reads data in the storage unit 5B-02. To this end, the controller 5B-01 may include at least one processor. The controller controls transceiver, storage unit and backhaul interface such that base station operation illustrated in FIG. 3 are performed.

The storage unit 5B-02 stores data for operation of the main base station, such as a basic program, an application program, and configuration information. Particularly, the storage unit 5B-02 may store information regarding a bearer allocated to an accessed UE, a measurement result reported from the accessed UE, and the like. In addition, the storage unit 5B-02 may store information serving as a criterion to deter mine whether to provide the UE with multi-connection or to discontinue the same. In addition, the storage unit (5B-02) provides stored data at a request of the controller 5B-01.

The transceiver 5B-03 consists of a RF processor, a baseband processor and plurality of antennas. The RF processor performs functions for transmitting/receiving signals through a wireless channel, such as signal band conversion, amplification, and the like. Specifically, the RF processor up-converts a baseband signal provided from the baseband processor into an RF band signal, transmits the same through an antenna, and down-converts an RF band signal received through the antenna into a baseband signal. The RF processor may include a transmission filter, a reception filter, an amplifier, a mixer, an oscillator, a DAC, an ADC, and the like. The RF processor may perform a down link MIMO operation by transmitting at least one layer. The baseband processor performs a function of conversion between a baseband signal and a bit string according to the physical layer specification of the first radio access technology. For example, during data transmission, the baseband processor encodes and modulates a transmission bit string, thereby generating complex symbols. In addition, during data reception, the baseband processor demodulates and decodes a baseband signal provided from the RF processor, thereby restoring a reception bit string.

The backhaul interface unit 5B-04 provides an interface for communicating with other nodes inside the network. The backhaul interface unit 5B-04 converts a bit string transmitted from the base station to another node, for example, another base station or a core network, into a physical signal, and converts a physical signal received from the other node into a bit string.

What is claimed is:

1. A method by a terminal, the method comprising:
selecting, by the terminal, a first cell;
performing, by the terminal, a first operation group if the terminal fails to acquire a Master Information Block (MIB) in the first cell, the first operation group comprises excluding the first cell as a candidate for cell selection/reselection and selecting another cell on the same frequency as the first cell if a selection criteria are fulfilled;
performing, by the terminal, a second operation group if the terminal succeeds to acquire the MIB and a System Information Block1 (SIB1) in the first cell and the MIB includes cellBarred set to barred and the SIB1 includes an intraFreqReselection set to NotAllowed, the second operation group comprises excluding the first cell as a candidate for cell selection/reselection and excluding another cell on the same frequency of the first cell; and
performing, by the terminal, a third operation group, if the terminal succeeds to acquire the MIB and the SIB1 in the first cell and the MIB includes cellBarred set to Notbarred and the SIB1 includes the intraFreqReselection, the third operation group comprises applying the configuration included in a servingCellConfigCommon and applying a specified PCCH configuration.

2. The method of claim 1,
wherein the terminal acquires the SIB1 in the first cell if the MIB acquired in the first cell includes cellBarred set to barred.

3. A terminal in a wireless communication system, the terminal comprising:
a transceiver configured to transmit and receive a signal; and
a controller configured to control the transceiver to:
select a first cell;
perform a first operation group if the terminal fails to acquire a Master Information Block (MIB) in the first cell, the first operation group comprises excluding the first cell as a candidate for cell selection/reselection and selecting another cell on the same frequency as the first cell if a selection criteria are fulfilled;
perform a second operation group if the terminal succeeds to acquire the MIB and a System Information Block1 (SIB1) in the first cell and the MIB includes cellBarred set to barred and the SIB1 includes an intraFreqReselection set to NotAllowed, the second operation group comprises excluding the first cell as a candidate for cell selection/reselection and excluding another cell on the same frequency of the first cell; and
perform a third operation group, if the terminal succeeds to acquire the MIB and the SIB1 in the first cell and the MIB includes cellBarred set to Notbarred and the SIB1 includes the intraFreqReselection, the third operation group comprises applying the configuration included in a servingCellConfigCommon and applying a specified PCCH configuration.

* * * * *